United States Patent [19]

Goheen et al.

[11] Patent Number: 5,207,916
[45] Date of Patent: May 4, 1993

[54] REVERSE OSMOSIS SYSTEM

[75] Inventors: Duane F. Goheen; David C. Nethercot, both of Naples, Fla.

[73] Assignee: MESCO, Inc., Naples, Fla.

[21] Appl. No.: 886,527

[22] Filed: May 20, 1992

[51] Int. Cl.$^5$ .............................................. B01D 61/12
[52] U.S. Cl. ................................... 210/637; 210/652; 210/321.65
[58] Field of Search ............... 210/634, 637, 641, 644, 210/649–652, 97, 130–133, 195.2, 257.2, 321.65, 321.72

[56] References Cited

U.S. PATENT DOCUMENTS

| | | | |
|---|---|---|---|
| 3,773,181 | 11/1973 | Calderwood | 210/321 |
| 3,791,526 | 2/1974 | Stana | 210/321 |
| 3,796,314 | 3/1974 | Kolek | 210/321 |
| 3,827,976 | 8/1974 | Stana | 210/636 |
| 3,853,756 | 12/1974 | Stana | 210/636 |
| 3,992,301 | 11/1976 | Shippey | 210/23 |
| 4,231,865 | 11/1980 | Spiegler | 210/636 |
| 4,321,137 | 3/1982 | Kohler | 210/137 |
| 4,629,568 | 12/1986 | Ellis, III | 210/636 |
| 4,966,708 | 10/1990 | Oklejas | 210/637 |
| 4,973,408 | 11/1990 | Keefer | 210/652 |
| 4,983,305 | 1/1991 | Oklejas | 210/642 |
| 5,049,045 | 9/1991 | Oklejas | 417/365 |

*Primary Examiner*—Frank Sever
*Attorney, Agent, or Firm*—Price, Heneveld, Cooper, DeWitt & Litton

[57] ABSTRACT

A single, reverse osmosis membrane system having a double-pass, product-staged design using first and second banks of membranes in series, with excessive pressure supplied by the pump to the feed to the first bank so that the concentrate flow from the first bank will be at sufficient elevated pressure to drive a turbocharger for increasing the low pressure product flow sufficiently to pass through the second bank of membranes, the excess pressure on the first bank being balanced by increased osmotic pressure from feedback of concentrate flow from at least one of the banks to the feed supply. Preferably, part of the concentrate flow from the first bank is dried on a double drum dryer or a single drum flaker for recycle use or disposal. The membranes for the first set are high rejection, high pressure membranes. The membranes for the second set are low rejection, low pressure membranes.

16 Claims, 1 Drawing Sheet

5,207,916

REVERSE OSMOSIS SYSTEM

BACKGROUND OF THE INVENTION

This invention relates to a double-pass, product-staged reverse osmosis separation system, particularly suited for a water demineralization system.

Reverse osmosis membrane systems have been known for years as a means for concentrating and separating dissolved solids (salts, organic matter) from liquid solutions. The reverse osmosis membrane serves to concentrate the materials in the "concentrate flow," i.e., the stream which does not pass through the membrane, while the separation occurs in the "product flow," i.e., the stream which passes through the membrane If concentration of the materials is desired, persons in the trade tend to call the process a concentration process. If dissolved material separation from the liquid in the product stream is desired, persons in the trade tend to call the process a purification process. By either name, this process utilizes both a concentrate flow and product flow.

When the terminology "reverse osmosis" is employed herein, it is in the known sense of applying pressure greater than the natural osmotic pressure created by the dissolved matter in the solution, and opposite thereto, across a semipermeable membrane. In the absence of this applied pressure, the natural osmotic pressure would cause the purer liquid to flow through the membrane toward the more concentrated liquid in a natural tendency for the system to try to reach equilibrium, i.e., to reach the same concentration of materials on both sides of the membrane. This natural osmotic pressure varies in amount depending upon the dissolved materials in the liquid, and the concentration thereof. The greater the concentration, the greater the osmotic pressure. The terminology "product stream" or "product flow" as used herein means that stream which has passed through the semipermeable membrane, whether the purpose of the process is to purify the product stream or to concentrate the concentrate stream. The term "concentrate stream" or "concentrate flow" is utilized herein to refer to that portion of the liquid stream which does not pass through the membrane. The term "cross flow reverse osmosis" is intended in its normal sense acceptable in the trade, i.e., where the flow of the inlet feed water is generally parallel to the membrane, such that the product flow has changed direction to pass through the membrane an through a product stream outlet therefrom, and the concentrate flow has continued to pass generally parallel to the membrane and out through a concentrate stream outlet therefrom.

The term "overproduction" when used herein is intended to mean the result of an excessively high net driving pressure causing an excessively high flux rate, the amount of water (carrier liquid) that passes through a square foot of available membrane Because industrial applications involve high salt content solutions (3% or higher), the desired removal of dissolved salts and the like from a solution often cannot be achieved by a single piece of equipment, i.e., a single pass through a membrane or an ion exchange bed. Thus, it is known that 90%-plus salt removal can be achieved by reverse osmosis units in series, or using a reverse osmosis/deionizer ion exchange resin exchanger.

Ion exchange resins are expensive, typically taking the form of polymeric beads produced from petroleum. Such resin units require frequent costly regeneration, typically using either hydrochloric acid or sulfuric acid and caustic soda. Subsequent disposal of the exhausted regenerant from the acid and caustic soda is troublesome and costly.

The other potential technique for desalting solution processes would be to utilize a two step process using a primary reverse osmosis membrane unit followed by a second reverse osmosis membrane system. However, the cost of such a dual system made according to traditional technology is exorbitant, requiring separate expensive transfer pumps, piping, controls, extra collection tanks, etc., often involving a hydraulic "nightmare," particularly when one of the units starts fouling. In controlling these systems, the feed pressure across the reverse osmosis membrane is limited to prevent "overproduction," i.e., producing more water than the available membrane surface area can properly handle. Therefore, it is normally necessary to provide a first pump, carefully regulated for the first reverse osmosis unit or set of reverse osmosis membranes, and a second pump for the second reverse osmosis unit or set of reverse osmosis membranes, which is regulated relative to the product output from the first reverse osmosis unit or first set of membranes and operates at an acceptable pressure for the membranes in the second reverse osmosis unit. The resulting arrangement is highly expensive and, as noted previously, results in a complex hydraulic setup which is difficult to design, to preset, and to control. The reason for the second pump upstream between the first and second unit is that product flow, i.e., product stream, emitted from the first unit or bank of membranes has lost its pressure due to flow through the first set of membranes. If the product flow is to be forced through the second stage membrane, it must be repressurized sufficiently to overcome the natural osmotic pressure before any liquid passes through the membrane.

In operating a reverse osmotic system, the pressure of the concentrate stream is not significantly lower than the initial feed pressure. However, the pressure of the product stream is negligible due to its having passed through the membrane.

SUMMARY OF THE INVENTION

The object of this invention is to provide a single, reverse osmosis membrane system with a double-pass, product-staged design, resulting in substantially lower initial capital cost than a traditional two unit system, and providing lower operating costs. The novel system enables the feed stream to flow through the first bank or set of reverse osmosis membranes, and then, without requiring a second pump, enables the product water stream to be repressurized and pumped to a second bank or set of reverse osmosis membranes, plumbed directly in series with the first bank of membranes. Moreover, this design is a relatively simple system which employs one pump upstream of the first bank of membranes. It is not hydraulically complex or difficult to regulate.

The system has a high pressure pump which is to be operated to purposely apply the first reverse osmosis unit an excessively high membrane feed pressure which would normally result in overproduction and therefore exceed recommended flow rates. The concentrate stream out of the first set of reverse osmosis membranes still has a substantially high pressure. This pressure is sufficient to operate a turbine which is located downstream of the first bank of membranes, and passes its energy to the pump side of the turbocharger which elevates the pressure of the product stream sufficiently above the natural osmotic pressure at the inlet of the second bank of membranes which forces the water through the membranes. The second stage requires fewer membranes and can operate at a higher gallons of flow per day (GFD) rate, because this stage is being fed with high quality product water from the first bank of reverse osmosis membranes. This pressure is greater than that which the first bank of membranes can properly handle without exceeding the recommended flux rates. However, by backfeeding the concentrate water from the second membrane bank to the feed supply tank, this increases the total dissolved solids (TDS) of the feed water, thereby increasing the osmotic pressure of the feed water to lower the net driving force across the membranes and result in a lower product flow rate. This feature in combination with the turbocharger provides a unique simplified system.

Another object of this invention is to provide this simplified system with an automatic membrane cleaning action when the system pump is shut down, utilizing the natural osmotic pressure of the water. The product stream out of the second bank of reverse osmosis membranes is typically dumped into a storage holding vessel or chamber when the system is operating. In this novel system, the second pass product stream is collected in a tank above the two membrane banks and holds product water to be allowed to flow in reverse out of the tank, responding to natural osmotic pressure. When the high pressure pump is shut down, the reversal of flow back through the membrane during osmosis cleans the foulants and dilutes the polarization layer left by the flow of water through the membrane during reverse osmosis.

Another component of this novel system is a single drum flaker or double drum dryer. This produces a dry soluble product eliminated from the waste stream. The drum dryer receives that portion of the concentrate stream not returned to the feed water tank and provides usable product, or at least a waste product subject to easier disposal.

These and several other objects, features and advantages of the invention will become apparent upon studying the following specification in conjunction with the drawings.

BRIEF DESCRIPTION OF THE DRAWINGS

The FIGURE is a schematic diagram of the novel single unit double-pass, product-staged reverse osmosis membrane system.

DESCRIPTION OF THE PREFERRED EMBODIMENT

Figure 1:
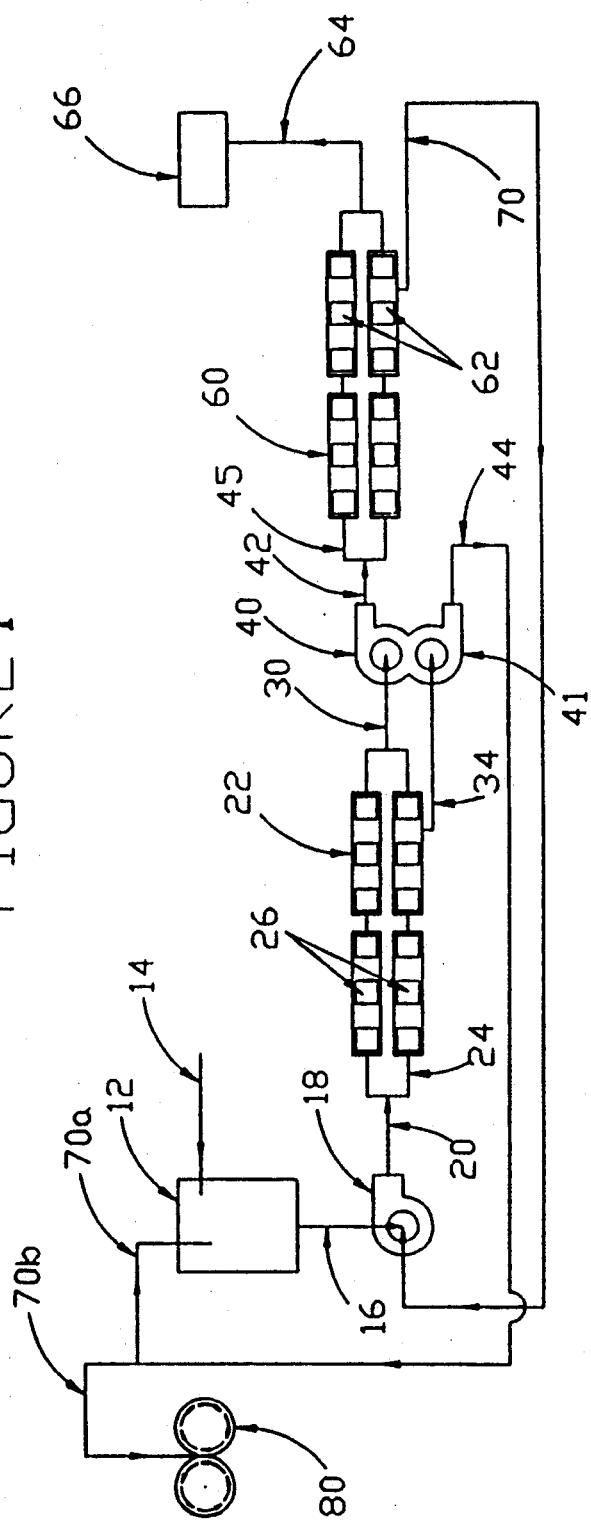

Referring now specifically to the drawing FIGURE, the reverse osmosis separation system 10 includes a feed water supply including a feed solution tank 12 having a raw supply inlet conduit 14 for receiving the liquid stream containing the dissolved solids to be removed. The feed solution tank 12 has an outlet conduit 16 to the inlet of a high pressure pump 18. The outlet of high pressure pump 18 is a conduit 20 feeding a first bank of pressure vessels 22 containing the first set of reverse osmosis membranes 26, preferably spiral wound membranes. These membranes are shown installed in parallel relationship to each other, with the outlet conduit 20 from pump 18 being divided into a common header/manifold header of inlets 24. These membranes are preferably of the type known in the trade as "high rejection" membranes, and are preferably of the high rejection thin film composite type, particularly the "Filmtec" ® brand obtainable from Dow Chemical company, Midland, Mich., U.S.A. As is known in the trade, these membranes normally consist of three layers, namely a polyester support web, a microporous polysulfone interlayer, and a thin barrier coating on the top surface. The reverse osmosis membrane technology is generally taught in Dow Chemical Company U.S. Pat. Nos. 4,992,485; 4,980,063; 4,957,817; 4,941,972; 4,927,540; 4,909,943; 4,894,165; 4,859,384; 4,859,338; 4,839,203; 4,828,700; 4,824,574; 4,812,238; 4,806,244; 4,797,187; 4,769,148; 4,765,897; 4,704,324; 4,652,373; 4,358,377; 3,630,378; 3,475,331 and 3,472,766, incorporated herein by reference. Hence, the details of membrane construction are not necessary to be set forth herein. These membranes may be of the planar sheet spiral wound configuration, or the hollow fiber type. According to traditional reverse osmosis technology, "high rejection, high pressure" membranes would not be employed as an initial reversal osmosis stage because of the high energy loss across the membrane. However, the present system successfully does so because of the combination of features employed, as will be explained.

On the downstream side of the first bank of membranes 22 is a product flow or product stream outlet 30 and a concentrate stream or concentrate flow outlet 34. The product stream at outlet 30 is at low pressure as a result of having passed through the semipermeable membranes. However, the concentrate stream 34 is still at elevated pressure inasmuch as it did not flow through the membranes so that its pressure drop is due only to frictional and hydraulic flow factors in the first membrane bank. These streams are conducted into the two chambers of a hydraulic turbocharger. Such a device is well known and is obtainable, for example, from Pump Engineering Co., Monroe, Mich., U.S.A. or Union Pump Company, Battle Creek, Mich., U.S.A. The turbocharger contains two chambers, the pump chamber 40 and the turbine chamber 41. In such a turbocharger, the function is to receive in one chamber, the turbine chamber 41, a liquid, here concentrate stream 34, which is under elevated pressure and which departs the chamber through outlet 44 under reduced pressure. The turbocharger also receives in the second chamber, the pump chamber 40, a second liquid under low pressure, here the product stream from outlet 30, and increases its pressure to the output conduit 42 to a substantial elevated pressure. The output product flow from the first bank of membranes 42 under elevated pressure becomes the feed water to the second bank of membranes and is adequately pressurized to force the feed water through the second bank of pressure vessels 60 and second set of reverse osmosis membranes 62, by having sufficient net driving force to overcome the natural osmotic pressure. The product flow from this second set is conducted by an output conduit 64 into a product water storage vessel 66 which is preferably elevated relative to membranes 62. The product flow inlet into storage vessel 66 is arranged so as to enable a reverse of flow from storage vessel 66 back into the membranes under natural osmotic pressure, from the product water side to the concentrate water side, when the high pressure pump deactivates, i.e., turbocharger 40–41 and pump 18 are shut down. This initiates the membrane flushing/cleaning action explained more fully hereinafter.

In order to have adequate pressure in the concentrate water flow at 34 to the turbocharger 40-41, for increasing the feed pressure of the product flow stream from outlet 30 enough to overcome the natural osmotic pressure at membranes 60, it is necessary to have pump 18 apply a greater feed pressure than what is typically needed for the first bank of membranes, to establish a product water flow rate, resulting in excessive pressure for these membranes, with the tendency of forcing an excessive amount of water through the available square feet of membrane surface area in the first bank of membranes. However, with the novel system set forth, this product flow is specially controlled by purposely increasing a counteracting osmotic pressure by conducting the concentrate flow output at 70 from the second bank of membranes 60 directly back to the inlet to pump 18 as shown in the drawing figure. A controlled portion of the concentrate discharge stream from outlet 44 of the turbocharger, i.e., of the concentrate stream from the first bank of membranes, is also directed back, partially to the feed supply, shown in the figure, going to the feed storage vessel 12 through conduit 70a, while the remainder is advanced to a dryer or evaporator through conduit 70b. This dryer or evaporator can be a simple drum flaker, or preferably a double drum dryer 80. The relative flow through conduits 70a and 70b is regulated by valves (not shown) on either one or both of these conduits. The material flaked or scraped from the dryer is relatively low in water content so that it is potentially usable as a recycled material, or at least is more readily disposable since it is much smaller in volume and basically dry.

The membranes used for the second bank are preferably low rejection, low pressure membranes, typically called brackish water elements. According to traditional thinking, these would be used for a first stage of reverse osmosis, but in the present unique system they are effectively used in the second stage.

Available reverse osmosis membranes for the first bank of membranes herein would be those designated in the trade, for example, as HR30-4040 and HR30-8080 high rejection, high pressure membranes. Available membranes employed for the second bank of membranes herein are lower rejecting, lower pressure membranes. According to conventional thinking, high rejection membranes would not normally be expected to be used in the first stage or first bank of reverse osmosis membranes because of the high energy loss across the membranes, as noted previously. However, in this invention a substantial amount of the energy through the first stage is recovered in that the excess pressure of the concentrate stream is applied by the turbocharger to the product stream into the second stage. Available low pressure, low rejection reverse osmosis membranes useful are, for example, BW30-8040, "Filmtec" (®) brand membranes from Dow Chemical Company, Midland, Mich.

As noted previously, the osmotic pressure of the supply water in the first bank of membranes or the second bank of membranes depends upon the quantity of dissolved solids in the solutions, and by the concentration thereof. Therefore, the amount of pressure which will be required at the turbocharger 40 for the input stream 42 to the second bank of membranes will vary in this regard depending upon the particular materials. Once the materials and the concentration are known, the pressure on the input feed necessary to overcome the osmotic pressure at the second set can be determined. Therefore, the excess pressure required at pump 18 can then be determined Once this excess pressure is known, the volume of feedback of the concentrate streams into the feed supply can be regulated to create a controlled osmotic pressure sufficient to throttle this excess feed pressure. The process can be run on a continuous basis after these initial settings noted above are made. Moreover, the process can be operated at tremendous savings compared to conventional processes/systems.

This invention has been found to be highly useful in desalting (deionizing) water, e.g., taking feed water which has, for example, around 3,000 parts per million (PPM) to 4000 PPM or more of total dissolved solids (TDS) and processing such to a very low TDS figure. In the process, a concentrate stream consisting of a much higher TDS is partially taken back to the feed stream to raise the feed water of the first bank of membranes to a higher TDS value. As noted previously, this greatly increases the osmotic pressure at the first bank of membranes, i.e., the pressure opposing the applied excess pressure from the pump, to thereby partially balance the excess amount of pressure from pump 18 across the membranes, thereby restricting the product water flow rate. Therefore, the pressure differential across the first bank of membranes will be appropriate for maintaining a proper flux rate. The excess applied pressure effective causes the concentrate flow at outlet 34 from the first stage to be at a significant high pressure for boosting the pressure of the infeed to the second stage 60 via turbocharger 40. The result is a relatively simple, inexpensive but effective, single unit, double-pass, product-staged reverse osmosis separation system having an operational cost which is but a small fraction of two known prior reverse osmosis staged systems.

Further, by enabling the ultimate product flow to flow back from the storage tank 66 when the pump and turbocharger are shut down and the system is at rest, the natural osmotic pressure across the membranes (which is opposite to the applied pressure which would occur during operation) causes back flow of purified liquid through the membranes. This causes separated solids collected on the input side of the membranes to be pushed off and removed therefrom for partial cleaning of the membranes during shutdown. The material removed from the membranes tends to flow out with the concentrate stream when the system is next activated. This automatic cleaning extends the life of the membranes.

Conceivably the preferred version of the system set forth herein may be modified to suit a particular installation without departing significantly from the unique concept and arrangement presented. Hence, the invention is not intended to be limited to the specific preferred embodiment set forth herein as illustrative, but only by the scope of the appended claims and the reasonable equivalents to the subject matter defined therein.

The embodiments of the invention in which an exclusive property or privilege is claimed are defined as follows:

1. A reverse osmosis separation system operable to separate a feed liquid having dissolved solids into a purified liquid and concentrate, through a single unit, double-pass, reverse osmosis unit with successive banks of reverse osmosis membranes in series while using only one high pressure pump, comprising:

a first bank of cross flow reverse osmosis membranes;

a high pressure pump arranged to apply excessive high pressure to feed liquid having solids therein to said first bank of reverse osmosis membranes;

a feed supply including a feed inlet to said pump;

said first bank of membranes having a product flow outlet for liquid that has passed through said first bank of membranes with loss of pressure, and a concentrate flow outlet for liquid that has not passed through said first bank of membranes and remains at high pressure;

means for providing an alterative to a second pump, including: said high pressure pump;

a dual chamber turbocharger downstream of said first bank of membranes and having a product flow outlet and a concentrate flow outlet, said turbo charger having a concentrate flow inlet for receiving from said first bank of membranes concentrate flow under high pressure as the dynamic liquid and discharging it out said concentrate flow outlet, and having a product flow inlet for receiving product flow under low pressure as the passive liquid and thereby elevating the pressure of said product flow to an elevated pressure when discharged from said turbocharger product flow outlet;

a second bank of cross flow reverse osmosis membranes downstream of said turbocharger product flow outlet and having a product flow inlet for receiving said elevated pressure product flow from said turbocharger product flow outlet, said second bank having a product flow outlet and a concentrate flow outlet; and said concentrate flow outlet from at least one of said first and second banks of membranes being connected back to said feed supply for supplying a controlled amount of concentrate flow back to said feed inlet to thereby increase the natural osmotic pressure across said first set of membranes a controlled amount for balancing excess pressure of said feed liquid on said first bank of membranes sufficient to control net drive force and maintain proper flux rates at said first bank of membranes in a manner to avoid excess pressure causing overproduction at said first set of membranes.

2. The reverse osmosis separation system in claim 1 wherein part of said concentrate flow from said first bank is connected back to said feed supply.

3. The reverse osmosis separation system in claim 1 wherein said concentrate flow from said second bank is connected back to said feed supply and part of said concentrate flow from said first bank is connected back to said feed supply.

4. The reverse osmosis separation system in claim 3 including an evaporator, the other part of said concentrate flow from said first bank being connected to said evaporator.

5. The reverse osmosis separation system in claim 4 wherein said evaporator is a double drum dryer.

6. The reverse osmosis system in claim 4 wherein said evaporator is a single drum flaker.

7. The reverse osmosis separation system in claim 1 including a retention bank connected to said product outlet from said second bank of membranes and arranged to allow product flow back to said membranes when said high pressure pump and said turbocharger are not operative, whereby flow through said membranes by natural osmotic pressure at least partially cleans said membranes of solids thereon.

8. The system in claim 1 wherein said first bank of membranes comprises high rejection, high pressure membranes.

9. The system in claim 8 wherein said second bank of membranes comprises low rejection, low pressure membranes.

10. A method for reverse osmosis separation of dissolved and/or suspended solids from a carrier liquid in a feed solution comprising the steps of:

pumping at excess elevated pressure the feed solution to a first bank of reverse osmosis semipermeable membranes, said excess pressure tending to cause overproduction at said first set of membranes, to produce a low pressure product flow of liquid through said membranes and an elevated pressure concentrate flow of liquid and solids not passing through the membranes;

providing an alternative to a second pump for a second bank of reverse osmosis membrane, comprising:

providing downstream of said first bank of membranes a turbocharger having a dynamic turbine part and a passive pump part;

introducing said elevated pressure concentrate flow from said first bank of membranes to the dynamic turbine part of the turbocharger while introducing said low pressure product flow from said first bank of membranes to the pump part of the turbocharger to elevate the pressure of said product flow to a value greater than the natural osmotic pressure on said product flow across a second bank of reverse osmosis, semipermeable membranes;

passing the elevated pressure product flow from said first bank through the second bank of reverse osmosis semipermeable membranes to produce a purified product flow and a concentrate flow; and increasing the osmotic pressure at said first bank of membranes by returning at least a portion of the concentrate flow from at least one of said first bank and said second bank back to said feed solution.

11. The method in claim 10 including returning part of the concentrate flow from said first set back to said pumping step, and returning the concentrate from said second set back to said pumping step.

12. The method in claim 10 including the step of evaporating the carrier liquid from the other part of the concentrate flow.

13. The method in claim 12 wherein said evaporating step is conducted on at least one of a double drum dryer and a single drum flaker.

14. The method in claim 10 including providing high rejection, high pressure, reverse osmosis, semipermeable membranes for said first bank.

15. The method in claim 14 including providing low rejection, low pressure, reverse osmosis, semipermeable membranes for said second bank.

16. The method in claim 10 including the step of conducting the purified product flow from said second bank to a storage vessel, and allowing the purified product flow to return out of the storage vessel when said pumping step and said turbocharging step are ceased, to result in purified product flow through membranes in a return direction to clean solids off the membranes.

* * * * *